(12) United States Patent
Yoo et al.

(10) Patent No.: US 11,382,310 B2
(45) Date of Patent: Jul. 12, 2022

(54) PET CARER AND CONTROLLING METHOD THEREOF

(71) Applicant: LG ELECTRONICS INC., Seoul (KR)

(72) Inventors: Hyunsun Yoo, Seoul (KR); Sungkyung Kim, Seoul (KR); Joogyeom Kim, Seoul (KR); Jaehung Chun, Seoul (KR); Myongsun Kim, Seoul (KR); Yousook Eun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 279 days.

(21) Appl. No.: 16/590,054

(22) Filed: Oct. 1, 2019

(65) Prior Publication Data

US 2020/0113153 A1 Apr. 16, 2020

Related U.S. Application Data

(60) Provisional application No. 62/744,767, filed on Oct. 12, 2018.

(30) Foreign Application Priority Data

Nov. 30, 2018 (KR) .................. 10-2018-0152884

(51) Int. Cl.
*A01K 13/00* (2006.01)
*B01D 46/10* (2006.01)
*A01K 1/00* (2006.01)
*B01D 46/00* (2022.01)
*E05F 15/73* (2015.01)

(52) U.S. Cl.
CPC .......... *A01K 13/001* (2013.01); *A01K 1/0052* (2013.01); *A01K 1/0076* (2013.01); *B01D 46/0038* (2013.01); *B01D 46/10* (2013.01); *E05F 15/73* (2015.01)

(58) Field of Classification Search
CPC ...... A01K 13/001; A01K 1/0076; E05F 15/73
See application file for complete search history.

(56) References Cited

U.S. PATENT DOCUMENTS

| 2006/0102096 A1* | 5/2006 | Cho ...................... A01K 29/00 |
| | | 119/671 |
| 2012/0118244 A1* | 5/2012 | Finch .................... A01K 13/00 |
| | | 119/600 |
| 2013/0119838 A1* | 5/2013 | Becker .................. E05F 15/20 |
| 2015/0189857 A1* | 7/2015 | Qirjazi .................. A01K 13/00 |
| 2021/0000075 A1* | 1/2021 | Im ......................... A01K 13/00 |

* cited by examiner

*Primary Examiner* — Joshua J Michener
*Assistant Examiner* — Henry Hooper Mudd
(74) *Attorney, Agent, or Firm* — Birch, Stewart, Kolasch & Birch, LLP

(57) ABSTRACT

Disclosed is a pet carer. The present invention includes a base, a container located on the base, the container having a space for receiving a pet therein, an entrance for the pet to enter/exit the space, and a discharge hole provided therein to discharge air, a door selectively opening/closing the entrance, a door drive device provided to the base to drive the door, a compressor supplying the air to the discharge hole, a filter unit located under the container to filter off dirt separated from the pet, and a suction fan located under the container to suck air into the filter unit.

19 Claims, 5 Drawing Sheets

PET CARER AND CONTROLLING METHOD THEREOF

Pursuant to 35 U.S.C. § 119, this application claims the benefit of the earlier filing date and right of priority to U.S. Provisional Application No. 62/744,767 filed on Oct. 12, 2018, and Korean Application No. 10-2018-0152884, filed on Nov. 30, 2018, the contents of each of which are hereby incorporated by reference herein in their entirety.

BACKGROUND OF THE INVENTION

Field of the Invention

The present invention relates to a pet carer, and more particularly, to a pet carer and controlling method thereof. Although the present invention is suitable for a wide scope of applications, it is particularly suitable for providing a function of removing dirt such as hair, dust and the like that may be attached to a pet, and filtering off the removed dirt.

Discussion of the Related Art

Recently, many people keep pets. A pet mainly lives at home. Occasionally, a pet may leave the home and enter a public place or the like.

For the hygiene of the public place, when a pet enters the public place, it is preferable that hair, dust, germs and the like (hereinafter collectively referred to as 'dirt') are removed from the pet in the first place. Then, the pet may enter the public place. Particularly, if the public place includes a closed space, it is further recommended that the pet enters the public place after removing the dirt. Yet, since there is no device suitable for removing dirt, pets enter the public place without removing the dirt.

Moreover, when a pet enters a home after going out, dirt attached to the pet is preferably removed. After bathing a pet to cleanse the pet, hair of the pet should be dried. Currently, a dryer for humans is typically used to dry the pet.

Thus, the demand for the development of a device for removing hair, dust, germs and the like of a pet and filtering off the removed dirt is rising. Since such a device is equipped with a function of removing hair, dust, germs, etc., a function of filtering off the removed hair, dust, etc., a function of killing the removed germs, and a function of drying the pet and the like, the device shall be referred to as a pet carer or a pet machine.

SUMMARY OF THE INVENTION

Accordingly, embodiments of the present invention are directed to a pet carer and controlling method thereof that substantially obviate one or more problems due to limitations and disadvantages of the related art.

An object of the present invention is to provide a pet carer and controlling method thereof, by which hair, dust and the like attached to a pet can be efficiently removed.

Another object of the present invention is to provide a pet carer and controlling method thereof, by which hair, dust and the like removed from a pet can be efficiently filtered off.

A further object of the present invention is to provide a pet carer and controlling method thereof, by which germs and the like can be removed from a pet and the removed germs can be killed.

Another further object of the present invention is to provide a pet carer and controlling method thereof, by which a pet can be efficiently dried.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a pet carer according to one embodiment of the present invention may include a base, a container located on the base, the container having a space for receiving a pet therein, an entrance for the pet to enter/exit the space, and a discharge hole provided therein to discharge air, a door selectively opening/closing the entrance, a door drive device provided to the base to drive the door, a compressor supplying the air to the discharge hole, a filter unit located under the container to filter off dirt separated from the pet, and a suction fan located under the container to suck air into the filter unit.

According to an exemplary embodiment of the present invention, the container may include a pair of partitions and wherein the door is provided between the partitions, the partitions and the door may have a prescribed curvature and a cylindrical shape overall, and top sides of the partitions and a top side of the door may be inclined inward.

According to an exemplary embodiment of the present invention, the door drive device may include a drive gear and a driven gear inscribed in the drive gear, the driven gear may have the same curvature radius of the door, and a circumference directional length of the driven gear may correspond to a circumference directional length of the door.

According to an exemplary embodiment of the present invention, the base may include a sleeve and a cover over the sleeve.

According to an exemplary embodiment of the present invention, a step difference and a slit may be provided between the sleeve and the cover, and an outside of the driven gear may be preferably projected through the slit and supported by the step difference. A guide may be provided to a center of the base, and an inside of the driven gear may be supported by the guide.

According to an exemplary embodiment of the present invention, the filter unit and the suction fan may be provided to a top side of the base, an open portion may be provided to a front side of the sleeve, and air coming from the suction fan may be externally discharged through the top side of the base and the open portion.

According to an exemplary embodiment of the present invention, the compressor may be provided within the partition of the container.

According to an exemplary embodiment of the present invention, a UV lamp configured to kill germs separated from the pet may be provided to the partition.

According to an exemplary embodiment of the present invention, a first sensor sensing an approach of the pet may be provided to an outside of the partition, a second sensor sensing a presence or non-presence of the pet and a size of the pet may be provided within the partition, a heater may be provided in an internal space of the partition, and a display may be provided to the door.

In another aspect of the present invention, as embodied and broadly described herein, a method of controlling a pet carer according to another embodiment of the present invention may include a first step of receiving a pet in a prescribed space, a second step of discharging a compressed air to the pet, and a third step of filtering off dirt separated from the pet.

According to an exemplary embodiment of the present invention, in the second step, an air flow for discharging air in the prescribed space externally may be prepared before discharging the compressed air.

According to an exemplary embodiment of the present invention, the method may further include a fourth step of killing germs separated from the pet.

The respective features of the above-described embodiments can be configured in a manner of being combined with other embodiments unless contradictory or exclusive to other embodiments.

Accordingly, a pet carer and controlling method thereof according to the present invention provide the following effects or advantages.

Firstly, according to the present invention, hair, dust and the like of a pet can be effectively removed before the pet enters a public place or a home.

Secondly, according to the present invention, hair, dust and the like removed from a pet can be effectively filtered off.

Thirdly, according to the present invention, germs attached to a pet can be removed and killed.

Fourthly, according to the present invention, a pet can be dried efficiently.

Effects obtainable from the present invention may be non-limited by the above mentioned effects, and other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Reference will now be made in detail to the preferred embodiments of the present invention, examples of which are illustrated in the accompanying drawings.

Although description will now be given in detail according to exemplary embodiments disclosed herein with reference to the accompanying drawings, the embodiments and drawings are used to help the understanding of the present invention.

Moreover, to help the understanding of the present invention, the accompanying drawings may be illustrated in a manner of exaggerating sizes of some components instead of using a real scale.

Thus, the present invention is non-limited to the following embodiment, and it is intended that the present invention covers the modifications and variations of this invention provided they come within the scope of the appended claims and their equivalents.

Figure 1:
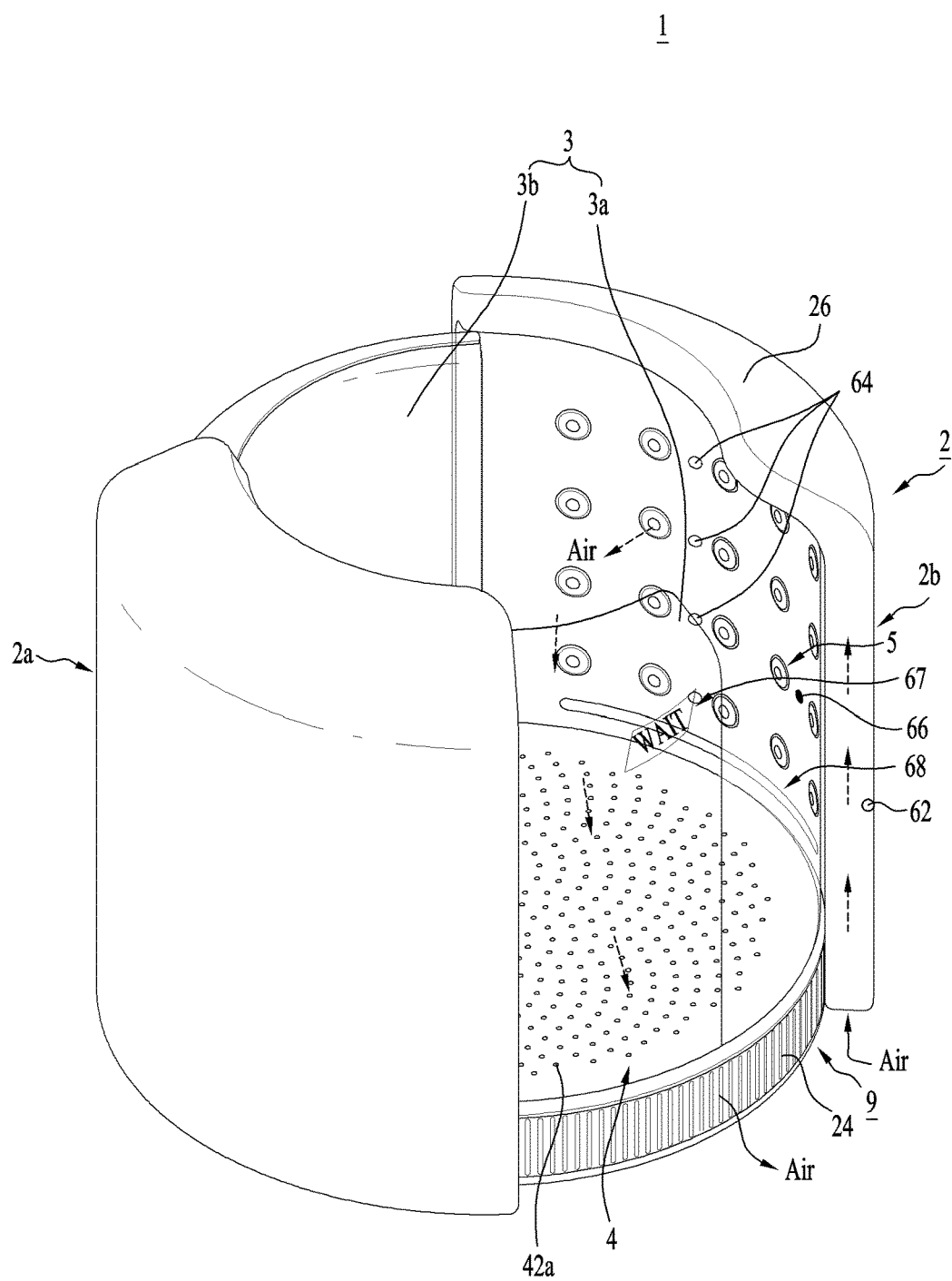
FIG. 1 is a perspective diagram showing a pet carer according to the present invention.

An overall structure of a pet carer according to a preferred embodiment of the present invention will now be described with reference to FIG. 1.

A pet carer 1 may include a base 9 and a container 2 provided over the base 9. The container 2 defines a space for receiving a pet therein. Dust, hair and germs attached to a pet are removed in the container 2.

An entrance for a pet to enter or exit the container 2 may be provided to the container 2. A portion of the container 2 may be open, and the open portion may become the entrance. A door 3 configured to selectively open/close the entrance may be provided to the container 2.

For example, the container 2 may include a pair of approximately vertical partitions 2a and 2b. A front door 3a and a rear door 3b may be provided to the open portions between the partitions 2a and 2b, respectively.

A discharge hole 5 for discharging air is provided within the container 2. The discharge hole 5 may be connected to a compressor 8 (see FIG. 2) configured to compress air.

A door drive device for revolving the door 3 may be provided to the base 9. A filter unit 4 configured to filter air (hereinafter called 'polluted air') containing dirt such as dust, hair and the like removed from a pet may be included. Moreover, a suction fan 7 (see FIG. 2) sucking air into the filter unit 4 may be provided to the base 9.

The filter unit 4 and the suction fan 7 may be provided between the container 2 and the base 9.

An operation of the pet carer 1 is schematically described as follows.

Initially, if the front door 3a is open, a pet enters the container 2. After the front door 3a is closed, air is discharged into the container 2 through the discharge hole 5. Hair, dust, germs and the like are removed from the pet by the discharged air. For clarity, such removal may be referred to as a 'pet shower'. The polluted air is filtered through the filter unit 4 provided under the container 2. The filtered air is then externally discharged through an outlet 24.

Meanwhile, a first sensor 62 configured to sense whether a pet approaches the pet carer 1 may be provided to the pet carer 1. The pet is sensed by the first sensor 62, whereby the front door 3a can be opened automatically. Moreover, a second sensor 64 configured to sense whether a pet exists within the container 2 may be provided.

The second sensor 64 may be provided to sense a size of a pet. As a size of a pet is sensed by the second sensor 64, a discharge hole to be operated may be determined and at least one of a strength (pressure) of a discharged air, a discharge direction (inclination) of a discharge hole and a temperature of a discharged air may be determined. Moreover, a temperature sensor 66 configured to sense the temperature of air within the container 2 may be provided.

For example, the first sensor 62 and the second sensor 64 may be provided to an outside and an inside of the partition 2b, respectively. The first sensor 62 and the second sensor 64 may include proximity sensors, optical sensors and the like.

In order to sense a size of a pet, a multitude of the second sensors 64 may be provided in a top-to-bottom direction.

A display 67 is provided so that an operating state of the pet carer 1 and the like may be displayed. For example, the display 67 may display a remaining time, a discharged air temperature and the like during a pet shower. The display 67 may be provided to the front door 3a or the rear door 3b.

The respective components are described in detail with reference to FIG. 1 and FIG. 2 as follows.

Initially, the container 2 is described.

The container 2 provides a space for receiving a pet therein to remove hair, dust, germs and the like from the pet. A shape of the container 2 is non-limited. Preferably, the container has a cylindrical shape. Namely, if the container 2 is in a cylindrical shape, air discharged from the discharge hole 5 is concentrated on a central area of the container 2 so as to effectively remove the dirt attached to a pet.

A prescribed portion of the container 2 is open, the door 3 is provided to the open portion, and a pet preferably enters or exits through the door 3. For example, the container 2 is configured with a pair of partitions 2a and 2b, and a front door 3 and a rear door 3b are preferably provided between the partitions 2a and 2b.

Although the front door 3a and the rear door 3b of the present embodiment are shown and described, a single door may be provided instead. The partitions 2a and 2b and the doors 3a and 3b are preferably configured in a circular cylindrical shape overall with a prescribed curvature.

Meanwhile, top and bottom sides of the container 2 are open preferably. As the base 9 is inserted in an open portion of the bottom side of the container 2, it is preferable that the container 2 and the base 9 are coupled solidly.

The top side of the container 2 may be closed. Preferably, the top side of the container 2 is open. This is because a pet generally may have claustrophobia. Moreover, in a situation where a leash is connected to a neck of a pet, the leash can be exposed out of the container 2 through an open portion of the top side of the container 2.

In an arrangement where the top side of the container 2 is open, polluted air within the container 2 may float upward through the open portion and may be possibly discharged out of the container 2. Therefore, it is preferable to prevent the polluted air from being externally discharged through the open portion of the top side of the container 2.

To this end, a top side of the partitions 2a and 2b preferably include an inclining portion 26 that inclines in a direction toward the center of the container 2. Moreover, a discharge hole 5e is provided to the inclining portion 26. Thus, air is discharged downward from the discharge hole 5e, whereby a sort of an air curtain function may be provided preferably.

Meanwhile, an outlet 24 for discharging the air externally after having passed through the filter unit 4 may be provided to the bottom side of the container 2. The partitions 2a and 2b and the outlet 24 may be integrally formed. Owing to such configuration, it is possible to effectively prevent the container 2 from falling by an unexpected motion of a pet within the container 2 or a lateral impact.

A multitude of discharge holes 5 are preferably provided to the insides of the partitions 2a and 2b. A multitude of the discharge holes 5a, 5b, 5c, 5d and 5e may be provided from the bottom to the top. Moreover, a multitude of the discharge holes 5 may be provided in a circumferential direction.

According to the above configuration, it is possible to selectively determine the discharge holes 5 to discharge air depending on a size of a pet. It is preferable that the strength (pressure) of the discharged air is adjusted depending on a size of a pet. Moreover, as the discharge hole 5 is configured in a manner that a discharge direction of the discharge hole 5 is adjustable in top and bottom directions, a discharge direction of air can be preferably adjusted depending on a size of a pet.

Figure 3:
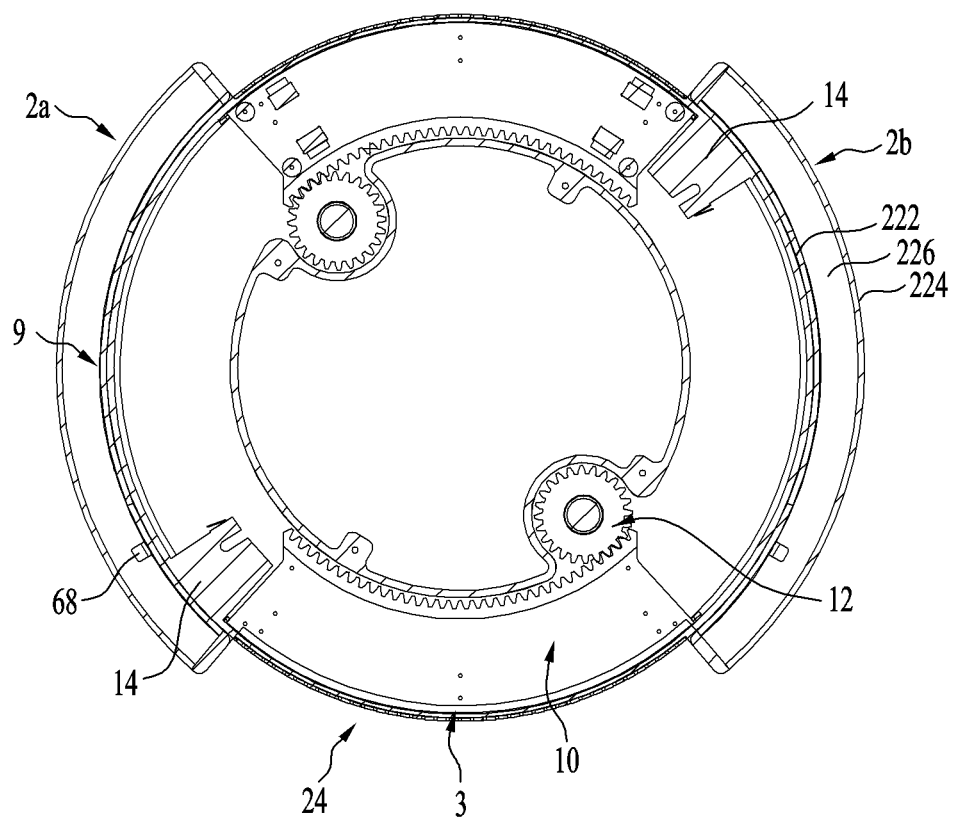
FIG. 3 is a cross-sectional diagram of a door drive device driving a door shown in FIG. 1.

Each of the partitions 2a and 2b of the container 2 may include an inner wall 222 and an outer wall 224, and an internal space 226 may be provided between the inner wall 222 and the outer wall 224 [see FIG. 3]. A compressor 8 may be provided in the internal space 226 of each of the partitions 2a and 2b. A tube 82 playing a role as a flow path of air may be connected between an exit of the compressor 8 and the discharge hole 5.

The compressor 8 sucks air from a bottom side (lower part) of each of the partitions 2a and 2b and sends the air to the discharge hole 5 through the tube 82. Of course, it is possible to send the compressed air of the compressor 8 to the discharge hole 5 without the tube 84. In this case, it is preferable that the space provided by the partitions 2a and 2b is sealed to prevent air from leaking except through the discharge hole 5.

Meanwhile, as described above, the discharge holes 5 may be configured in a multitude of vertical columns extending from a bottom side to a top side. A valve 84 is preferably provided to a portion of the tube 82 diverged into each horizontal row of the discharge holes 5.

According to the above configuration, it is possible to selectively discharge air depending on a size of a pet. For example, if a size of a pet is small, the discharge holes 5a and 5b in the first and second lower rows are open. If a size of a pet is big, it is possible to open the discharge holes 5a, 5b, 5c, 5d and 5e in all the rows.

Meanwhile, the pet carer 1 may include a heater 88. The heater 88 can heat air flowing into the compressor 8. Alternatively, the heater 88 may be configured to heat the exit of the compressor 8 or the tube 82.

By use of the heater 88, the temperature within the container 2 can be maintained at a favorite temperature of a pet. Also, it is possible to dry a pet after a bath using air heated by the heater 88.

A sterilizer 68 for killing germs and the like separated from a pet may be provided to the pet carer 1. The sterilizer 68 may include a UV lamp, and more preferably, a UV LED lamp, by which the present invention is not limited. The UV lamp may be provided to the bottom sides of the partitions 2a and 2b as well.

The front door 3a and the rear door 3b shall now be described.

The front door 3a and the rear door 3b are provided between a pair of the partitions 2a and 2b, respectively. To reduce the claustrophobia of a pet to some extent, the doors 3a and 3b are preferably transparent. For example, the doors 3a and 3b may be made of transparent glass or synthetic resin material. It is preferable that each of the front door 3a and the rear door 3b can be selectively opened or closed. The opening/closing mechanism of the doors shall be described later.

The filter unit 4 is described as follows.

The filter unit 4 is the part for filtering off hair, dust and the like separated from a pet. The filter unit 4 may be located at the bottom side of the container 2.

The filter unit 4 may include a plate 42 having a multitude of holes 42a, a filter 44 and a photocatalyst 46. Shapes of the plate 42, the filter 44 and the photocatalyst 46 may include the shapes corresponding to an inside of the container 2, e.g., a circular shape.

The plate 42 is a part coming in contact with a foot of a pet and includes a multitude of holes 42a for air flow. The plate 42 may be made of metallic material, and more preferably, stainless steel material. Namely, if the plate 42 is made of a metallic plate, light of the UV lamp 68 is diffuse-reflected to improve the sterilization effect.

The filter 44 may include a multi-filter that includes a pre-filter, a HEPA filter and the like. The photocatalyst 46 may include a deodorization photocatalyst. To activate the photocatalyst, a light source, and more preferably a Light-Emitting Diode (LED), may be provided.

The suction fan 7 for air flow will now be described.

The suction fan 7 generates a suction force for sucking polluted air of the container 2 into the filter unit 4. The suction fan 7 may be provided between the filter unit 4 and the base 9. In order to suck the air from the whole bottom side of the filter unit 4, the suction fan 7 may be approximately the same size as the filter unit 4.

As the suction fan 7 is activated, the polluted air of the container 2 is sucked in a direction of the filter unit 4, and the air filtered by the filter unit 4 is externally discharged through an open portion 98 provided to the base 9. Namely, as the polluted air in the top side of the filter unit 4 is sucked in a vertical direction, the filtered air can be discharged through a lateral side of the base 9 (approximately in a circumferential direction).

The base 9 is described as follows.

As described above, the suction fan 7 and the filer unit 4 may be located over the base 9.

The filter unit 4, the suction fan 7 and the base 9 may be disposed in a manner of being inserted in the container 2. Hence, a shape of the base 9 is preferably an approximately cylindrical shape corresponding to an inner shape of the container 2.

Meanwhile, a door drive device for driving the door 3 may be provided in the internal space of the base 9.

The device for driving the door 3 may include a drive gear 12 and a driven gear 10 connected to the drive gear 12. A motor (not shown) is connected to a bottom side of the drive gear 12, and the door 3 may be connected to a top side of the driven gear 10.

If the motor is driven, the drive gear 12 is rotated. As the drive gear 12 is rotated, the driven gear 10 is rotated. If the driven gear 10 is rotated, the door 3 connected to the driven gear 10 is rotated as well.

The drive gear 12 may employ a circular gear. The driven gear 10 is engaged with the drive gear 12 and may use a portion of the circular gear.

A circumference directional size of the driven gear 10 may correspond to the open portion of the container 2 or the door 3. For example, it is preferable that the circumference directional size of the driven gear 10 is substantially equal to a size of a circumference direction of the open portion of the container 2 or a size of a circumference direction of the door 3. Within the base 9, a stopper 14 restricting a rotational extent of the driven gear 10 may be provided.

Figure 2:
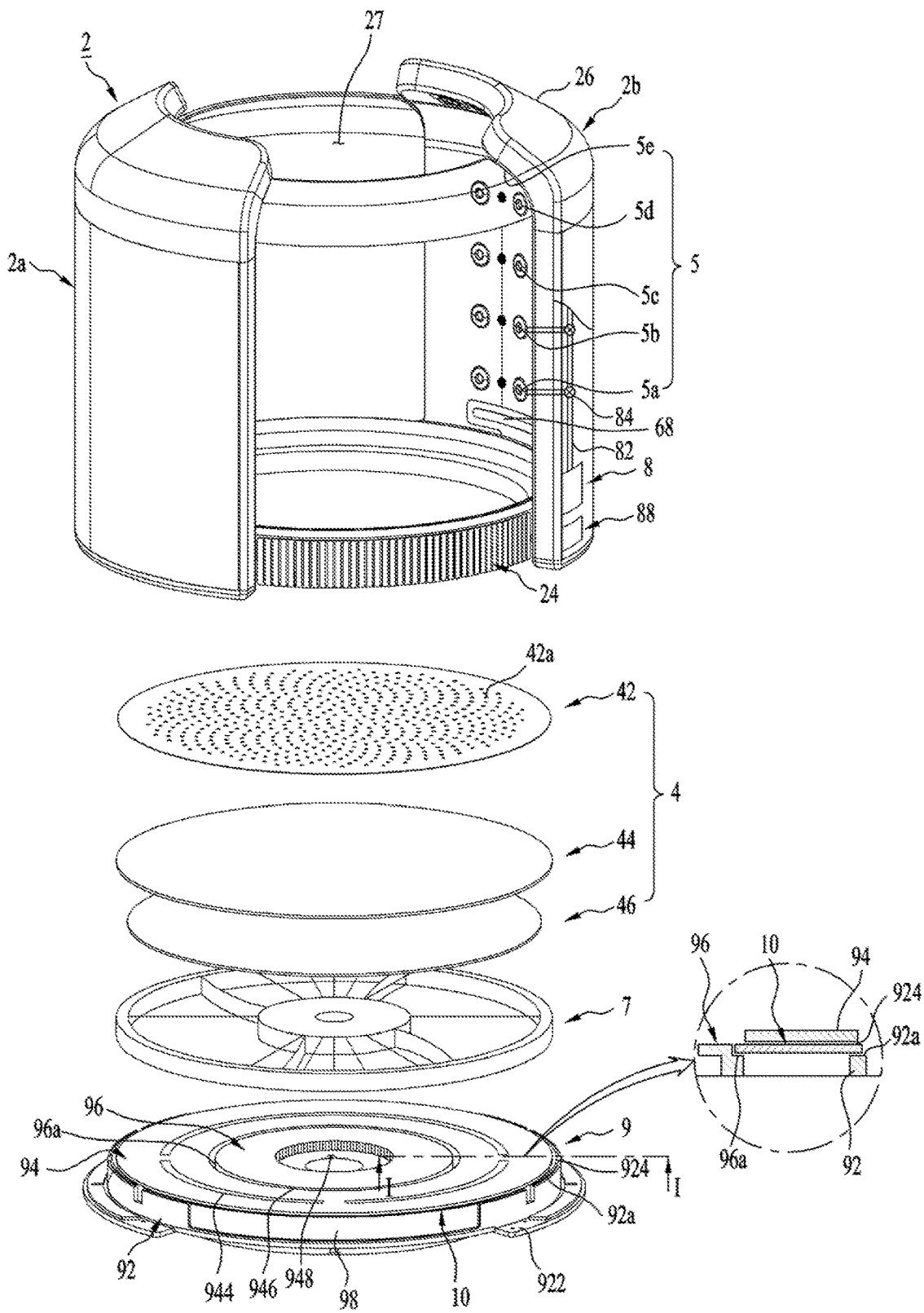
FIG. 2 is an exploded perspective diagram of the pet carer shown in FIG. 1.

Referring now to FIG. 2, the base 9 is further described in detail as follows.

The base 9 may include a sleeve 92 and a cover 94 on the sleeve 92. The sleeve 92 has a circular shape and is projected upward. The cover 94 preferably extends inward from a top side of the sleeve 92. A support portion 922 extending outward may be provided to an outer circumferential surface of the sleeve 92.

A groove 944 in which air flows may be provided to the cover 94. The groove 944 may be in a circular shape.

Meanwhile, a guide 96 may be provided to the center of the base 9. The guide 96 may have an approximately circular shape and also have a step difference 96a provided to an outside thereof. Preferably, an inside of the driven gear 10 is supported by the step difference 96a. (Details of the support structure of the driven gear 10 shall be described later.)

A portion of a front side of the sleeve 92 is open and the open portion 98 preferably communicates with the outlet 24 of the container 2. Hence, the air filtered by the filter unit 4 passes through the groove 944 of the base 9, a gap 946 between the base 9 and the guide 96, and a center portion 948 of the guide 96 and then flow to the open portion 98 of the base 9. The air having passed through the open portion 98 of the base 9 is finally discharged externally by passing through the outlet 24 of the container 24.

Meanwhile, as the door 3 is coupled to the driven gear 10, it should be installed rotatably while receiving a prescribed load. A structure for this is described as follows.

The sleeve 92 and the cover 94 can be connected together with a step difference 92a. A slit 924 may be provided along the step difference 92a.

An outside of the driven gear 10 is exposed out of the base 9 through the slit 924 and supported by the step difference 92a, and the door 3 is joined to an exposed portion of the outside of the driven gear 10.

The inside of the driven gear 10 is supported by a step difference 96a of an outside of the guide 96. Hence, the driven gear 10 is supported between the step difference 96a of the guide 96 and the step difference 92a of the base 9.

If the driven gear 10 is rotated, the driven gear 10 slides while supported by the step difference 96a of the guide 96 and the step difference 92a of the base 9. Of course, a structure for reducing frictional resistance may be employed for the step difference 96a of the guide 96 and the step difference 92a of the base 9.

Figure 4:
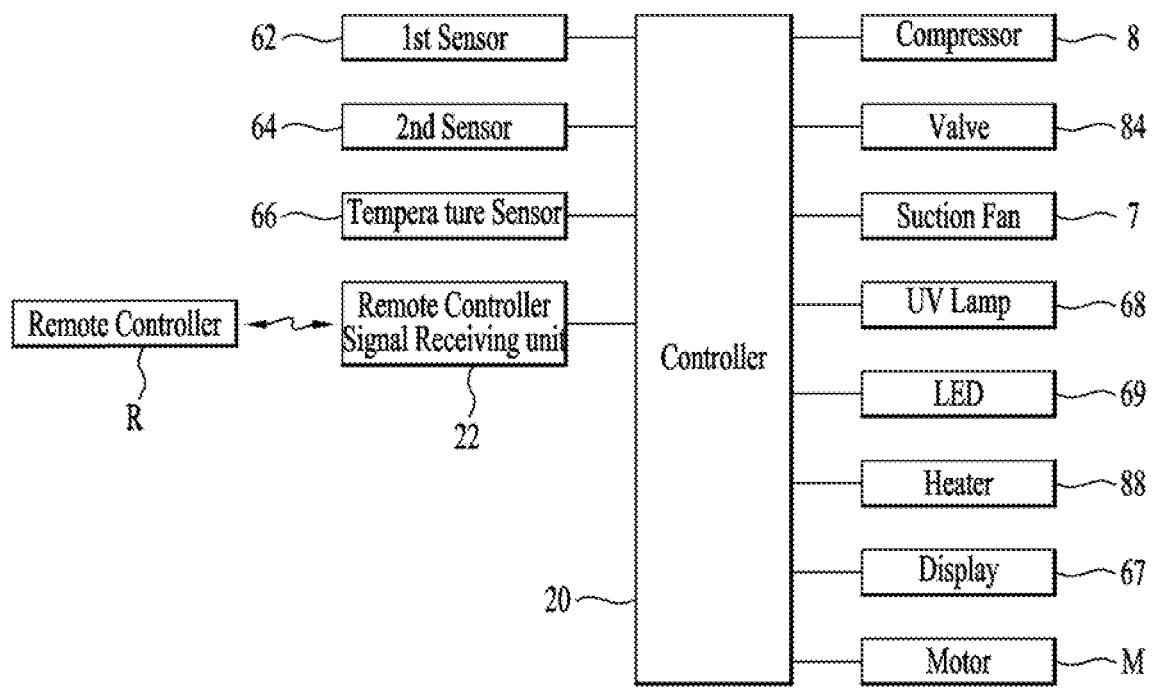
FIG. 4 is a block diagram showing a control configuration of a pet carer according to an embodiment of the present invention.

A control configuration of the pet carer 1 according to the preferred embodiment of the present invention is described with reference to FIG. 4 as follows.

Various input and output units may be connected to a controller 20 having a prescribed algorithm.

The input unit may include a first sensor 62, a second sensor 64, a temperature sensor 66, and a remote controller signal receiving unit 22 receiving a signal of a remote controller R connected to the input unit. The output unit may include a display 67, a motor M, a compressor 8, a valve 84, a suction fan 7, a UV lamp 68, a photocatalyst activation LED 69 and a heater 88.

The controller 20 receives a signal of the input unit, undergoes a determination process using a prescribed algorithm, and then outputs an appropriate drive signal and the like to the output unit.

Here, the input unit, the controller 20 and the output unit are sorted in a functional aspect for clarity of description and are not conceptually separated by hardware or software. Such components may be implemented as a single software or a multitude of modules as part of a single software. Moreover, such components may be implemented as appropriate combination of hardware or software.

Figure 5:
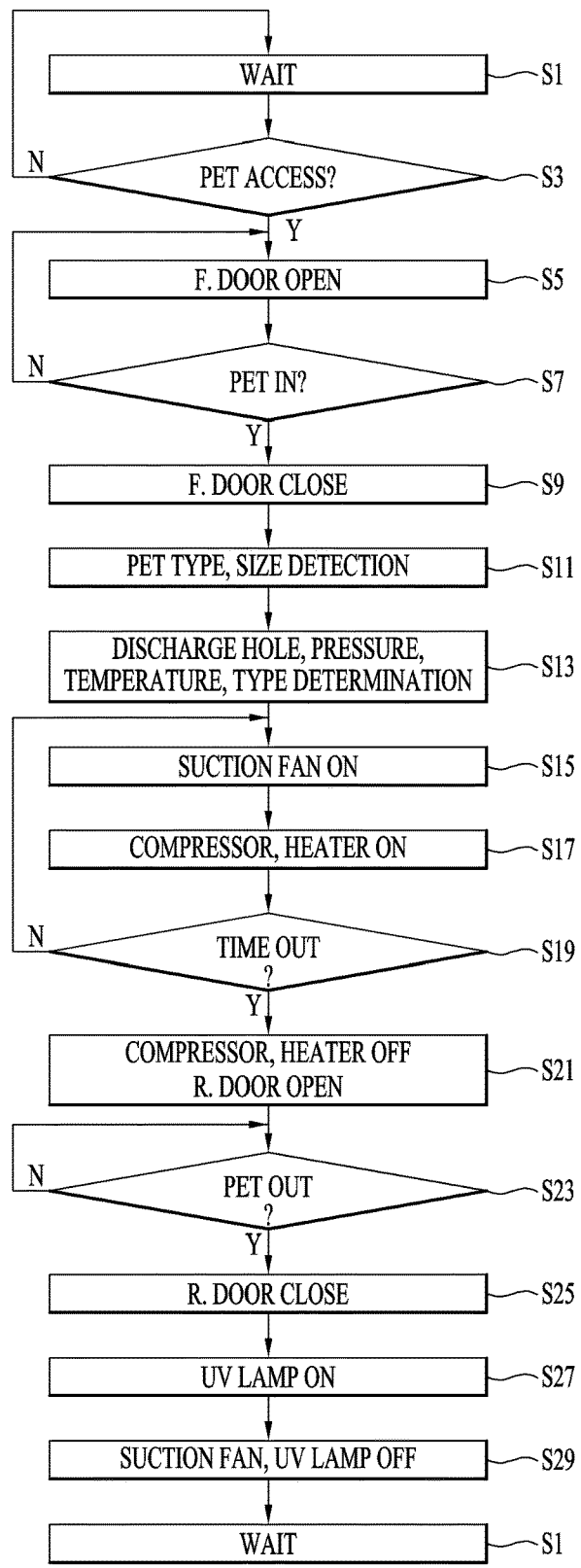
FIG. 5 is a flowchart for a method of controlling a pet carer according to an embodiment of the present invention.

A method of controlling the pet carer 1 according to the present invention is described with reference to FIG. 4 and FIG. 5.

In a standby state of the pet carer 1, the front door 3a and the rear door 3b are in closed state [S1], and the output unit such as the compressor 8 and the like is generally in an OFF state.

A pet approaching the pet carer 1 is sensed using the first sensor 82 [S3]. When the pet is detected, if it is determined that the pet intends to enter the pet carer 1, the front door 3a is opened by driving the motor M [S5].

Once the pet enters the container 2, the second sensor 84 senses the pet [S7]. If the pet is determined to have completely entered the container 2, the front door 3a is closed by activating the motor M [S9].

Subsequently, by sensing a type and size of a pet [S11], at least one of values of control factors such as a discharge holes to be open, a discharge hole inclination, a strength (pressure) of a discharged air, a discharged air temperature, a discharge time and the like is determined [S13]. The size of the pet can be determined using the second sensor 84. Moreover, a value of a control factor according to the type and size of the pet can be stored in advance in a manner of being tabled through tests and the like.

The pet can be showered according to the determined value of the control factor. The pet's shower can be implemented through an appropriate combination of a step of discharging air into the container, a step of filtering air within the container, and a step of externally discharging the filtered air. Meanwhile, it is possible to simultaneously perform the sensing of the entry completion of a pet and the sensing of a type and size of a pet.

Meanwhile, in order to prevent the air within the container 2 from being discharged to a top side of the container 2, the suction fan 7 may operate before the compressor 8 operates [S15].

The reason for this is described as follows. First of all, in a standby state of the pet carer 1, air within the container 2 is in a stationary state. Hence, if the suction fan 7 is activated first, the stationary air is led in a bottom direction of the container 2, whereby the air within the container 2 can be prevented from being discharged upward. Hence, by strongly operating the suction fan 7 before an activation of the compressor 8 if possible, the direction of the air within the container 2 is preferably led to the bottom direction of the container 2 from the beginning.

After expiration of a prescribed time after the activation of the suction fan 7, the compressor 8 is activated [S17]. Namely, air is discharged into the container 2 through the discharge hole 5. If necessary, the heater 88 is activated. If a pet is a pet dog, the temperature of 42 degrees Celsius is suitable.

Air is discharged through the discharge hole 5 by the activation of the compressor 8. By this air, hair, dust, germs and the like attached to the pet are separated. The polluted air is sucked into the filter unit 4 so as to be cleaned. The cleaned air is externally discharged through the outlet 24.

As a prescribed time expires, if the air shower of the pet is complete [S19], the compressor 8, the heater 88 and the like are deactivated and the rear door 3b is opened [S21]. In doing so, in order to prevent the polluted air from being externally discharged, the suction fan 7 may remain activated.

Whether the pet has left the container is sensed by the second sensor 84. If the pet is determined as having left the container 2 [S23], the rear door 3b is closed [S25].

In this state, by driving the UV lamp 68, sterilization is performed for a prescribed time [S27]. The UV lamp 68 may be activated in the course of the air shower of the pet. If so, the pet may be startled. Hence, the UV lamp 68 is preferably activated after the pet has completely left the container 2.

If the prescribed sterilization time expires, the UV lamp 68 and the suction fan 7 are deactivated [S29] and a standby state is then entered [S1].

Meanwhile, the display 67 is activated during a whole process of the pet shower, whereby a user can be informed of operation states (e.g., a remaining pet shower time, an air temperature, etc.) of the pet carer 1.

Meanwhile, although the front door 3a and the rear door 3b are described as automatically opened/closed in the above-described embodiment, they can be opened/closed manually (e.g., using a remote controller R).

As described above, when a pet enters a café, a public place and the like, the pet carer 1 according to the present invention can be used for the removal of dust attached to the pet, sterilization of the pet and the like. In this case, the pet carer 1 according to the present invention plays a role as a sort of a pet clean gate. Therefore, the pet can be cleaned and the public place can be maintained clean.

The pet carer 1 according to the present invention can also be used at home and the like. In this case, the pet carer 1 according to the present invention can play a role as a sort of a pet clean room or a pet drying room. Therefore, the pet can be cleaned and the home can be maintained clean. Moreover, the pet can be dried simply after the pet's bath.

It will be appreciated by those skilled in the art that various modifications and variations can be made in the present invention without departing from the spirit or scope of the inventions. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A pet carer, comprising:
 a base;
 a container located on the base, the container including:
  a space to receive a pet therein;
  an entrance to permit the pet to enter the space; and
  a discharge hole provided in the container to discharge air into the space;
 a door to selectively open and close the entrance;
 a door drive to drive the door;
 a compressor to supply the air to the discharge hole;
 a filter provided under the container to filter out dirt separated from the pet; and
 a suction fan provided under the container to suck air into the filter,
 wherein the door drive comprises
  a drive gear; and
  a driven gear engaged with the drive gear, and
 wherein the driven gear and the door have a same curvature.

2. The pet carer of claim 1, wherein the container comprises a pair of partitions, and
 wherein the entrance is provided between the pair of partitions.

3. The pet carer of claim 2, wherein the pair of partitions and the door have a circular cylindrical shape when the pair of partitions and the door are combined.

4. The pet carer of claim 3, wherein top portions of the pair of partitions are inclined inwardly.

5. The pet carer of claim 2, wherein the compressor is provided in an internal space of one of the partitions.

6. The pet carer of claim 2, wherein at least one of the partitions includes a UV lamp configured to kill germs separated from the pet.

7. The pet carer of claim 2, further comprising:
a first sensor provided to an outer side of one of the partitions and configured to sense an approach of the pet; and
a second sensor provided to an inner side of one of the partitions and configured to sense a presence or non-presence of the pet and a size of the pet.

8. The pet carer of claim 2, further comprising:
a heater provided in an internal space of one of the partitions; and
a display provided to the door.

9. The pet carer of claim 1, wherein the base comprises:
a sleeve; and
a cover located on the sleeve.

10. The pet carer of claim 9, wherein a step difference and a slit are provided between the sleeve and the cover, and
wherein an outer extent of the driven gear projects through the slit and is supported by the step difference.

11. The pet carer of claim 10, wherein a guide is provided at a center of the base, and
wherein an inner extent of the driven gear is supported by the guide.

12. The pet carer of claim 11, wherein the filter and the suction fan are provided at a top side of the base,
wherein a front side of the sleeve includes an open portion, and
wherein air coming from the suction fan is externally discharged from the top side of the base to the open portion.

13. A method of controlling a pet carer, comprising:
providing a container having a space therein, wherein a top side of the container is open;
receiving a pet within the space;
operating a suction fan to suction the air and dirt from within the space;
discharging, by a compressor, a compressed air to the pet to separate dirt from the pet;
filtering the dirt separated from the pet; and
releasing the pet from the space,
wherein the suction fan suctions the air and the dirt to a bottom side of the container, and
wherein the compressor is activated after expiration of a prescribed time after the activation of the suction fan.

14. The method of claim 13, wherein the compressed air is discharged downwardly.

15. The method of claim 13, further comprising operating a heater to heat the compressed air.

16. The method of claim 13, further comprising operating a sterilization lamp within the container to kill germs separated from the pet.

17. The method of claim 13, further comprising:
providing a first door to the container, wherein the receiving the pet within the space comprises opening the first door; and
closing the first door to contain the pet within the space.

18. The method of claim 17, further comprising providing a second door to the container, wherein the releasing the pet from the space comprises opening the second door to release the pet.

19. The method of claim 13, further comprising:
providing a first door and a second door to the container;
opening the first door to receive the pet within the space;
closing the first door to contain the pet within the space;
operating a suction fan to suction the air and dirt from within the space while discharging the compressed air to the pet;
opening the second door to release the pet from the space while operating the suction fan; and
operating a sterilization lamp within the container to kill germs separated from the pet.

* * * * *